3,092,666
PRODUCTION OF ALKYLATED BORANES
Leonard Haynes Long, Exeter, England, assignor to National Research Development Corporation, London, England, a British corporation
No Drawing. Filed Oct. 19, 1961, Ser. No. 146,352
Claims priority, application Great Britain Oct. 24, 1960
9 Claims. (Cl. 260—606.5)

This invention relates to the manufacture of alkylated boranes.

In the United Kingdom patent specification No. 853,063 there is described a process for the production of alkylated boranes having the formula $B_2H_{(6-n)}(Alk)_n$, wherein $n=1$, 2, 3 or 4, by reacting at a suitable temperature within the range 0–200° C. and a suitable pressure within the range 1–250 atmospheres or higher a hydride containing a chemically combined metal with (a) a boron trialkyl $B(Alk)_3$ and a hydrogen halide or
(b) a boron trialkyl $B(Alk)_3$ and a boron halide $BX_3$ or
(c) an alkyl boron halide having the formula $(Alk)_mBX_{(3-m)}$, wherein $m=1$ or 2.

According to the present invention a process for the production of alkylated boranes in yields of up to 80% or more comprises reacting e.g. at temperatures up to 250° C. and pressures up to 120 atmospheres (I) an aluminum trialkyl $Al(Alk)_3$ or an aluminum alkyl halide $Al(Alk)_mX_{3-m}$, wherein $m=1$ or 2, or a mixture of the same, with
(II) a borohydride such as sodium borohydride $NaBH_4$ or lithium borohydride $LiBH_4$, and
(III) a hydrogen halide HX or a boron halide $BX_3$.

The halogen X may advantageously be chlorine. Alkyl groups such as methyl, ethyl, propyl and butyl are preferred. The aluminum alkyl halides $Al(Alk)_mX_{3-m}$ or a mixture of the same may be prepared in situ from the corresponding aluminum trialkyl $Al(Alk)_3$ and aluminum trihalide $AlX_3$. The temperature should be within the range of 0–250° C.

For the process of the invention, temperatures of the order of 60–180° C. and, when the alkyl is methyl or ethyl, pressures of the order of 20–120 atmospheres are especially useful. Atmospheric presures may however also be employed when the alkyl is ethyl, and is to be preferred when it is propyl or butyl. Lithium borohydride is more reactive than the sodium compound.

The method has certain advantages in that the pressures required are normally lower than for those reactions in which boron trialkyls are involved. Further, aluminum trialkyls are in general more readily available as starting materials than boron trialkyls. Another interesting feature is that in addition to alkyl diboranes as the principal products, varying quantities of alkyl derivatives of higher boranes may also be formed simultaneously.

The main reaction may be described by one of the following and typical general equations, according to whether a hydrogen halide HX or boron halide $BX_3$ is used:

(1) $nAl(Alk)_3 + 6LiBH_4 + (6+3n)HX$
$\rightarrow 6LiX + nAlX_3 + 3B_2H_{6-n}(Alk)_n + (6+3n)H_2$
(2) $4nAl(Alk)_3 + (18-3n)LiBH_4 + (6+3n)BX_3$
$\rightarrow (18-3n)LiX + 4nAlX_3 + 12B_2H_{6-n}(Alk)_n$ These equations do not provide a complete picture of the process since, especially when a boron halide is used as a reactant side reactions producing alkyl derivatives of higher boranes such as pentaborane together with additional quantities of hydrogen also occur. A typical example may be written:

$Al(Alk)_3 + 3LiBH_4 + 2BX_3 \rightarrow 3LiX$
$+ AlX_3 + B_5H_6(Alk)_3 + 3H_2$

Such reactions become relatively more important in the temperature range 150–200° C. or higher and for more prolonged times of heating. Derivatives of the higher boranes may account for a considerable fraction (up to 30% or more) of the total boron present.

The alkyl diboranes, which in general readily disproportionate, are produced in an equilibrium mixture, on occasion accompanied by varying quantities of boron trialkyl or diborane. The relative proportions of the mono-, di-, tri-, and tetraalkyl derivatives can be varied by changing the relative proportions of the reactants, i.e. the Alk:B ratio, and to some extent the conditions employed during separation. The mono- and di-alkyl derivatives are favoured by a high proportion of reactant II, while the tri- and tetra-alkyl derivatives are favoured by a high proportion of reactant I.

The invention without limiting it will now be exemplified below:

Example 1.—Production of Methyl Diboranes From $LiBH_4$ HCl and $Al(CH_3)_3$

Dry hydrogen chloride (17.0 g.), and aluminum trimethyl (16.8 g.) respectively contained in glass tubes cooled in liquid nitrogen were quickly transferred to the bomb of an autoclave containing lithium borohydride (12.0 g.). The apparatus was rapidly closed and made pressure-tight before the volatile compounds had had time to warm up appreciably, and it was allowed to stay at room temperature for 2 hours. The pressure rose to 30 atmospheres and remained constant at that value. The autoclave was then heated to 173° C. whereupon the pressure rose to 57.5 atmospheres. After 3 hours the heating was stopped, and on cooling the bomb to room temperature the pressure fell to 38.5 atmospheres.

The reaction gave rise to hydrogen, methane, ethane and 8 ml. (measured at −78° C.) of a liquid mixture of methyl diboranes containing a trace (0.2 ml.) of boron dimethyl chloride $B(CH_3)_2Cl$. The products were worked up and separated by vacuum fractionation at −78°, −120° and −196° C. and identified analytically. Actually isolated were $B_2H_4(CH_3)_2$ 0.2 ml., $B_2H_3(CH_3)_3$ 2.6 ml., $B_2H_2(CH_3)_4$ 0.7 ml. and $B(CH_3)_3$ 4.5 ml., but the relative proportions show that tetramethyl diborane had largely disproportionated during separation into boron trimethyl and other methyl diboranes because of too rigid fractionation conditions.

Example 2.—Production of Methyl Diboranes From $LiBH_4$ HCl, $Al(CH_3)_3$ and $AlCl_3$ 15.4 g. lithium borohydride (in 20% excess) thoroughly mixed with 6.6 g. aluminum trichloride, together with 14.4 g. aluminum trimethyl and 43.1 g. dry hydrogen chloride (the last two in glass tubes frozen to −196° C.), were introduced into the bomb of the autoclave in the usual way. The initial pressure at room temperature, under equilibrium conditions, was 60 atmospheres. The apparatus was first heated to 115° C. and kept at that temperature for one hour, the pressure having increased uniformly with the rise in temperature to 98 atm. The heating was stopped and the pressure at 18° C. was subsequently observed to be 72 atm. indicating that reaction had occurred. The bomb was heated again but this time to 173° C. and kept at this temperature for 2 further hours, while the pressure rose to 119 atm.; and stayed at that value during the rest of the period of heating. After cooling, the pressure at 18° C. was 76 atm., a little higher than before, thus suggesting that further reaction had taken place.

The products obtained were the same as those described in Example 1, although the proportions differed. In particular, there was a large increase in the amount of $B(CH_3)_2Cl$ found. The products were worked up in substantially the same way as before. On this occasion 2.0 ml. of nearly pure tetramethyl diborane were isolated. Boron estimations gave values of 25.0 and 24.6% boron close to the theoretical value 25.8%. In addition a small, less volatile fraction (0.7 ml.) was isolated which had the properties of a mixture of methylated higher boranes.

*Example 3*

The procedure of Example 2 was repeated, except that the proportion of HCl was reduced and that of $Al(CH_3)_3$ slightly increased. The quantity of $AlCl_3$ used was also increased.

The reactants were introduced in the bomb of the autoclave in the following amounts: 15.4 g. aluminum trimethyl, 29.1 g. hydrogen chloride, 15.7 g. lithium borohydride and 9.7 g. aluminum trichloride. The initial pressure at room temperature was 50 atmospheres, and during the 4 hours' heating it remained constant at 121 atm. On cooling to room temperature it fell to 78 atm.

The products were the same as before, but the relative yields were very different. In particular, the quantity of $B(CH_3)_2Cl$ was again reduced to a trace (0.2 ml.), while the total yield of the equilibrium mixture of methyl diboranes was increased to 10.3 ml. The quantity of derivatives of higher boranes amounted to 0.3 ml.

In a repeat experiment in which heating was conducted at 165° C. for 6 hours the yield of methyl diboranes was smaller, but two fractions of lower volatility (about 0.4 ml. each) were shown not to be hydrolysed by cold water and to be free of halogen. They were found to possess mean molecular weights (by vapour density) of 105 and 112 respectively. The latter fraction had a measured boron content of 50.0% proving it to contain derivatives of higher boranes.

*Example 4.—Production of Methyl Diboranes From $LiBH_4$, $BCl_3$ and $Al(CH_3)_3$*

The amounts of the reactants used were 15.0 g. of aluminum trimethyl, 43.7 g. of boron trichloride (in 60% excess with respect to the aluminum compound) and 8.1 g. of lithium borohydride (in 200% excess with respect to the boron trichloride). The first two compounds were contained in glass tubes and cooled to liquid nitrogen temperature before they were transferred to the vessel of the bomb, which already contained the lithium borohydride under a nitrogen atmosphere. The apparatus was quickly made pressure-tight and allowed to stay at room temperature until the pressure was observed to stay constant at approximately 6 atmospheres, then it was heated to 173° C. and maintained at this temperature for 3 hours. The pressure increased to 48.5 atmospheres and remained constant during the period of heating. The pressure in the bomb after resuming room temperature was 29 atmospheres.

The main products of this reaction are methyl boron chlorides and boron trimethyl but some tetramethyl diborane $(B_2H_2(CH_3)_4$ B.P. 68.6° C. M.W. 83.61) appeared to be present in the products obtained.

*Example 5.—Production of Ethyl Diboranes From $LiBH_4$, $BCl_3$, $Al(C_2H_5)_3$ and $AlCl_3$*

This reaction was carried out in glass apparatus at atmospheric pressure.

An intimate mixture of 5.9 g. of lithium borohydride and 3.0 g. of aluminum trichloride was placed in a three-necked flask fitted with a reflux condenser and previously filled with a nitrogen atmosphere. A slow stream of dry nitrogen was maintained during the experiment and passed out of the top of the reflux condenser through two traps kept respectively at −78° and −196° C. and thence to the exit by way of a mercury seal. The addition of 17.3 g. of aluminum triethyl to the flask was effected by means of a dropping funnel while the flask was at room temperature. The dropping funnel was subsequently replaced by a suitably connected tube containing 19.0 g. of cooled liquid boron trichloride before heating was commenced. The heating of the flask was effected by an oil bath which was maintained at 110° C. while the boron trichloride was gently warmed and caused to pass through the flask as a slow stream of vapour. Reaction commenced immediately and product refluxed from the condenser. Subsequently the oil bath was brought to 140° C. and everything volatile distilled over in the traps.

At the end of the experiment the contents of the traps amounted to 25 ml. of a colourless liquid containing almost 100% of the boron present. This, on examination in vacuum apparatus, yielded 8 ml. of $B(C_2H_5)_2Cl$ and 17 ml. of a mixture of ethyl diboranes and their disproportionation products. The latter was made up of 1.2 ml. of boron triethyl, 2.5 ml. of triethyl diborane 7.3 ml. of diethyl diborane, 1.0 ml. of monoethyl diborane and 5.0 ml. of diborane. The large quantity of diborane showed that disproportionation had been favoured by the prolonged refluxing and fractionation, and to obtain the maximum yield of ethyl diboranes it was necessary to allow the products to re-establish equilibrium in a closed system at room temperature. The total yield of ethyl diboranes was 80–85% (based on boron).

*Example 6.—Production of Methyl Diboranes From $LiBH_4$, $BCl_3$, $Al(CH_3)_3$ and $AlCl_3$*

The excellent results of Example 5 suggested that Example 4 could profitably be repeated with a lower $BCl_3:Al(CH_3)_3$ ratio and with $AlCl_3$ added. Accordingly the following quantities were used in the autoclave: 20.2 g. of aluminum trimethyl, 38.6 g. of boron trichloride, 7.1 g. of lithium borohydride and 14.6 g. of aluminum trichloride. The reactants were heated at 166° C. for 2.5 hours.

In addition to some hydrogen, a small quantity of hydrogen chloride was produced. The main product consisted of 9.5 g. of an equilibrium mixture of methyl diboranes, corresponding to a yield (based on boron) of 55–60% (i.e. much higher than in Example 4). Appreciable quantities of methyl boron chlorides were also formed and a small quantity (0.3 g.) of a mixture of methylated higher boranes.

In a repeat experiment the reactants were heated at 170° C. for 9 hours in the following proportions: 15.9 g. of aluminum trimethyl, 22.6 g. of boron trichloride, 5.1 g. of lithium borohydride and 8.8 g. of aluminum trichloride. In this case the proportions of the products differed. The yield of methyl diboranes which were now accompanied by additional boron trimethyl was lower and only a small quantity of methyl boron chlorides was obtained. At the same time an appreciable fraction (3.0 g.) of lower volatility and containing a little over 30% of the total boron present was isolated, which from its properties was a mixture of higher borane derivatives, mainly trimethyl pentaborane $B_5H_6(CH_3)_3$ and tetramethyl pentaborane $B_5H_5(CH_3)_4$. The fraction was chlorine-free and did not liberate hydrogen immediately in contact with cold water. Different portions of this mixture had boron contents ranging from 44.5 to 56.0% and mean molecular-weight values (by vapour density) of 103, 119 and 120.

I claim:

1. A process for the preparation of an alkylated borane which comprises reacting at least one aluminum alkyl reactant selected from the group consisting of an aluminum trialkyl, $Al(Alk)_3$, and an aluminum alkyl halide, $Al(Alk)_mX_{3-m}$ wherein $m$ is an integer of 1 to 2, with a hydride selected from the group consisting of sodium borohydride and lithium borohydride and a halide selected from the group consisting of a hydrogen halide and a boron trihalide.

2. A process according to claim 1 in which the hydrogen halide is hydrogen chloride.

3. A process according to claim 1 in which the boron trihalide is boron trichloride.

4. A process according to claim 1 in which the aluminium alkyl halide, $Al(Alk)_mX_{3-m}$, is prepared in situ from the corresponding aluminium trialkyl $Al(Alk)_3$ and aluminium trihalide $AlX_3$.

5. A process according to claim 1 in which temperatures of the order of 60–180° C. are used.

6. A process according to claim 1 in which the alkyl groups of the alkylated boranes are alkyl groups of 1 to 2 carbon atoms and the pressures used are of the order of 20–120 atmospheres.

7. A process according to claim 1 in which the alkyl groups of the alkylated boranes are alkyl groups of 2 to 4 carbon atoms and the pressures used are of the order of atmospheric pressure.

8. A process for the preparation of an alkylated borane which comprises reacting at least one aluminum alkyl reactant selected from the group consisting of an aluminum trialkyl, $Al(Alk)_3$, and an aluminum alkyl halide, $Al(Alk)_mX_{3-m}$ wherein $m$ is an integer of 1 to 2, with a hydride selected from the group consisting of sodium borohydride and lithium borohydride and a halide selected from the group consisting of a hydrogen halide and a boron trihalide at a temperature within the range of 0–200° C. and a pressure within the range of 1–120 atmospheres.

9. A process for the preparation of an alkylated borane which comprises reacting at least one aluminum alkyl reactant selected from the group consisting of an aluminum trialkyl, $Al(Alk)_3$, and an aluminum alkyl halide, $Al(Alk)_mX_{3-m}$ wherein $m$ is an integer of 1 to 2, with a hydride selected from the group consisting of sodium borohydride and lithium borohydride and a halide selected from the group consisting of a hydrogen halide and a boron trihalide at a temperature within the range of 100–250° C. and a pressure within the range of 1–120 atmospheres.

No references cited.